US 8,458,772 B2

(12) United States Patent
Uchikawa

(10) Patent No.: US 8,458,772 B2
(45) Date of Patent: Jun. 4, 2013

(54) COMMUNICATION APPARATUS, CONTROL METHOD FOR THE COMMUNICATION APPARATUS, AND STORAGE MEDIUM

(75) Inventor: Shinichi Uchikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 12/729,017

(22) Filed: Mar. 22, 2010

(65) Prior Publication Data

US 2010/0251342 A1 Sep. 30, 2010

(30) Foreign Application Priority Data

Mar. 25, 2009 (JP) ................................ 2009-074364

(51) Int. Cl.
*G06F 1/32* (2006.01)
*G06F 21/20* (2006.01)

(52) U.S. Cl.
USPC .................. 726/4; 726/17; 726/21; 713/321; 713/323

(58) Field of Classification Search
None
See application file for complete search history.

(56) References Cited

U.S. PATENT DOCUMENTS

| 2002/0041689 A1* | 4/2002 | Morimoto | 380/270 |
| 2007/0240004 A1* | 10/2007 | Maeda | 713/322 |
| 2009/0025069 A1* | 1/2009 | Tanaka | 726/5 |
| 2009/0037981 A1* | 2/2009 | Kino | 726/2 |
| 2009/0070857 A1* | 3/2009 | Azuma | 726/3 |
| 2009/0217063 A1* | 8/2009 | Tomita | 713/310 |

FOREIGN PATENT DOCUMENTS

| CN | 1163529 A | 10/1997 |
| CN | 1869881 A | 11/2006 |
| JP | 2002-271334 A | 9/2002 |
| JP | 2004-243533 A | 9/2004 |

OTHER PUBLICATIONS

U.S. Appl. No. 12/720,472, filed Mar. 9, 2010, Kaori Shizuno.
U.S. Appl. No. 12/720,575, filed Mar. 9, 2010, Go Inoue.

* cited by examiner

*Primary Examiner* — Jeffrey Pwu
*Assistant Examiner* — Van Nguyen
(74) *Attorney, Agent, or Firm* — Canon U.S.A., Inc. IP Division

(57) ABSTRACT

In an apparatus, if it is detected that a condition is met to switch the apparatus from the normal power mode to a power saving mode that consumes less power than the normal power mode, a communication speed for the apparatus to communicate via a network is changed, an authentication process is executed, and the apparatus is switched from the normal power mode to the power saving mode when the authentication process is completed.

24 Claims, 6 Drawing Sheets

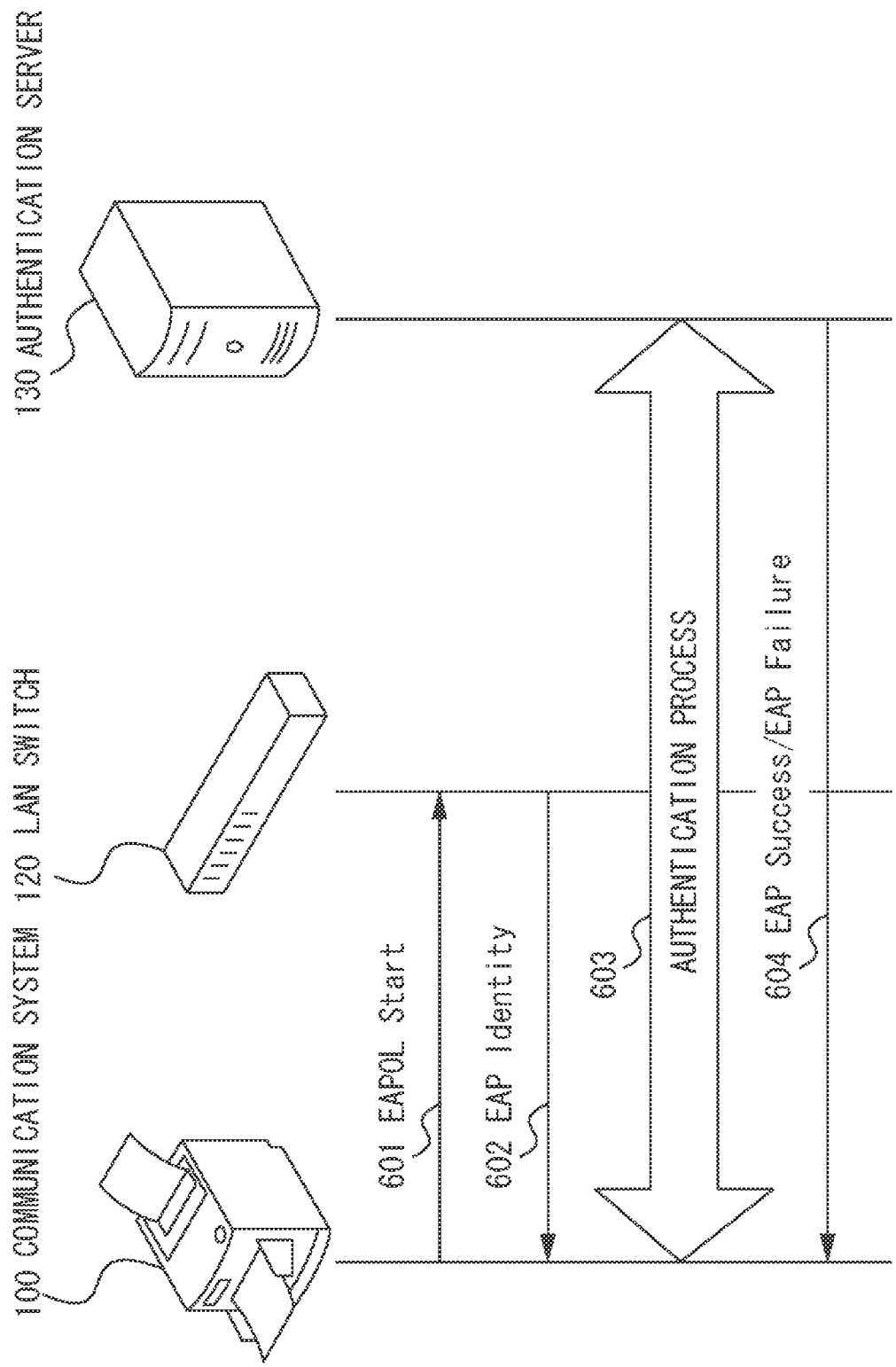

COMMUNICATION APPARATUS, CONTROL METHOD FOR THE COMMUNICATION APPARATUS, AND STORAGE MEDIUM

BACKGROUND OF THE INVENTION

1. Field of the Invention

The present invention relates to a communication apparatus connectable to a network.

2. Description of the Related Art

There has been a well-known information processing system provided with a power saving mode that reduces power consumption by going into a standby mode. An example of this information processing system is a communication system including an information processing apparatus, which is a main body side with a main CPU, and a discrete network interface card (NIC) with a sub CPU. In such a communication system, during its power saving mode, generally, the information processing apparatus on the main body side is switched to a power saving mode while the modules on the NIC side that consume less electric power are put in standby state with electric power remaining to be supplied thereto from the normal power supply.

The communication system (more specifically, the main body side) returns to the normal power mode in response to an event that a predetermined condition has been met in the power saving mode. An example of the predetermined condition is that a packet matching the condition for returning to the normal power mode has been received from the network. To enable such a packet to be received, even if power supply is switched to the power saving mode, power is kept being supplied to the NIC, and the connection (link) to the hub (a local area network (LAN) switch) is maintained.

Meanwhile, some recent NICs support a communication speed of 1000 Mbps (megabits per second) (1 Gbps (gigabits per second)) in addition to the conventional speeds of 10 Mbps and 100 Mbps. However, in a communication mode at 1000 Mbps, power consumption of an NIC is higher than that at 10 Mbps or 100 Mbps. As is widely known, there is a method capable of reducing power consumption in power saving mode by re-establishing the link to the network at 10 Mbps or 100 Mbps when power supply is switched from the normal power mode to the power saving mode.

For example, Japanese Patent Application Laid-Open No. 2004-243533 discusses how a media access control (MAC) of an image forming apparatus determines a communication speed to suit a communication performance of a hub when the power supply is switched to an energy saving mode while the image forming apparatus is connected to the hub.

Japanese Patent Application Laid-Open No. 2002-271334 reveals how to change a communication speed of one's own apparatus to a slower set communication speed if no information has been exchanged for a predetermined length of time between a host computer and an NIC connected to a LAN.

As an authentication standard to authenticate connections to the LAN, for example, IEEE 802.1X is well known. Connections to the LAN are limited by authentication to prevent those other than predetermined terminal devices from connecting to a computer network.

In an environment where callers are to be authenticated by an authentication system, such as IEEE 802.1X, when power supply is switched to a power saving mode by the above-described method, if the communication speed is changed, a situation occurs as follows.

More specifically, after the link was disconnected (link down) to change a communication speed, if the communication speed setting has been changed and a link has been established again (link up), it is determined that a new NIC has been connected to the network, so that this connection is to be authenticated anew.

Therefore, although the communication speed has been changed by performing link up and link down, if power supply has been switched to the power saving mode without performing an authentication process, even after the switch to the power saving mode, authentication is to be performed anew. In other words, in order to execute an authentication process, power supply is to be returned from the power saving mode to the normal power mode, which means that full power saving effects cannot be obtained.

After the communication speed has been changed by generating a link down and a link up status, even if an authentication process is started before power supply is switched to the power saving mode, there is a possibility that a similar situation as described above arises. In the above-described authentication process, since information is to be exchanged between the LAN switch and the authentication server on the network, a certain length of time is consumed depending on network traffic density and load status of the LAN switch and the authentication server. When power supply has been switched to the power saving mode while an authentication process is in progress, immediately after this switch of power supply mode, a packet related to the authentication process is to be received from the LAN switch or the authentication server. This initiates immediate return to the normal power mode. To put it simply, sufficient power saving effects cannot be obtained.

SUMMARY OF THE INVENTION

According to an aspect of the present invention, an apparatus includes a detection unit configured to detect, when the apparatus is operating in a normal power mode, whether a condition is met to switch the apparatus from the normal power mode to a power saving mode that consumes less electric power than the normal power mode, a changing unit configured to change a communication speed for the apparatus to communicate via a network when the detection unit detects that the condition is met, an authentication unit configured to execute an authentication process when the communication speed has changed, and a control unit configured to switch the apparatus from the normal power mode to the power saving mode when the authentication process is completed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a sequence diagram illustrating details of an authentication process based on IEEE 802.1X.

DESCRIPTION OF THE EMBODIMENTS

Various exemplary embodiments, features, and aspects of the invention will be described in detail below with reference to the drawings.

Figure 1:
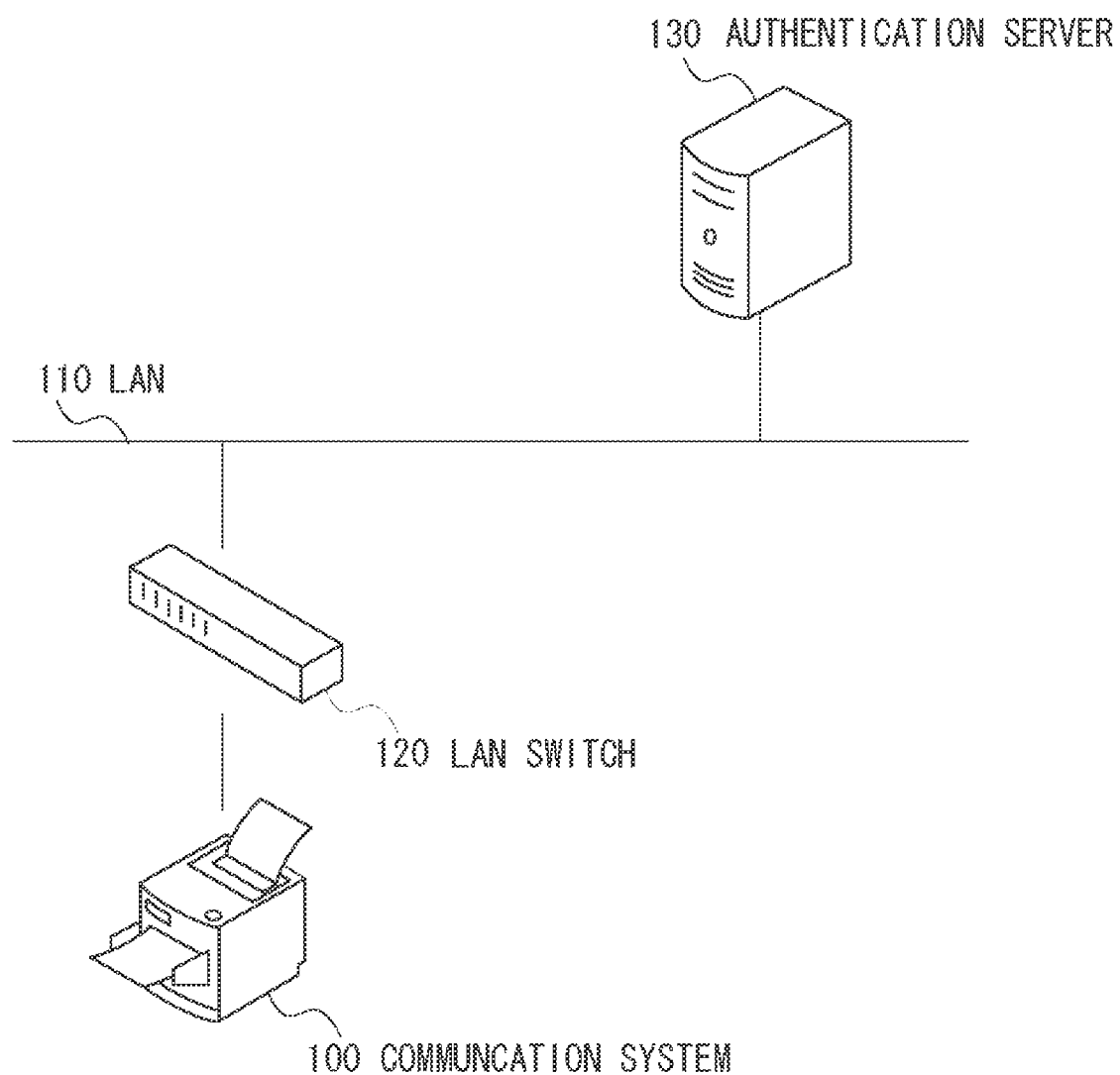
FIG. 1 is a general view of a network including a communication system.

FIG. 1 is a general view of a network including a communication system. A communication system 100, a LAN switch 120, and an authentication server 130 are interconnected via a LAN 110, and they can communicate with each other. The communication system 100, the LAN switch 120, and the authentication server 130 respectively perform roles of a supplicant, an authenticator, and an authentication server also known as a Remote Authentication Dial in User Service (RADIUS) server.

When connected via a physical line to the LAN 110, the communication system 100 executes an authentication process based on IEEE 802.1X, is authenticated by the authentication server, and is allowed to connect to the LAN 110.

Figure 2:
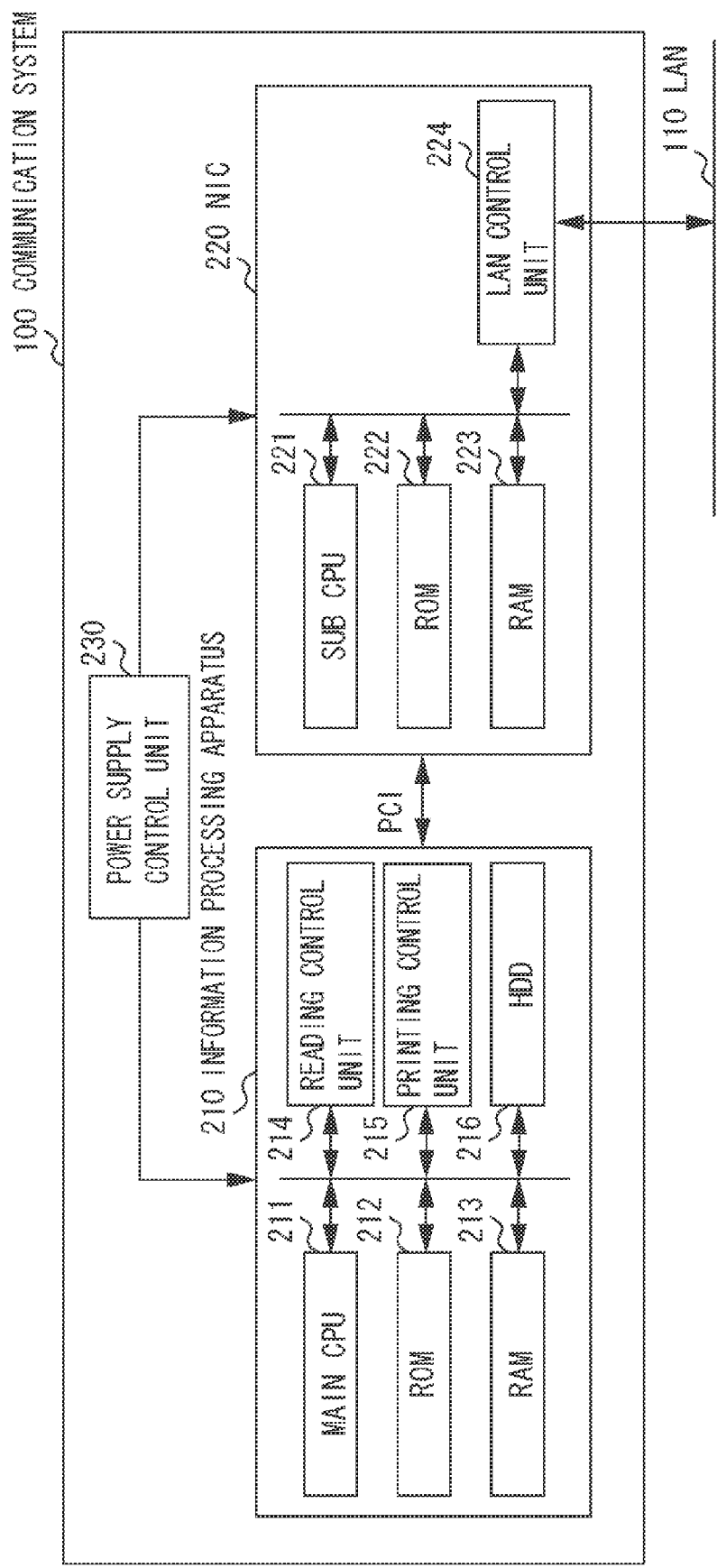
FIG. 2 illustrates a block diagram of a hardware configuration of the communication system.

FIG. 2 is a block diagram illustrating a hardware configuration of the communication system 100. The communication system 100 includes an information processing apparatus 210 and an NIC 220. The information processing apparatus 210 is connected to the LAN 110 via the NIC 220.

A main CPU 211 executes a software program of the information processing apparatus 210, and controls the operation of the whole apparatus 210. A RAM 213 is a random access memory, which temporarily stores data when the main CPU 211 controls the apparatus 210. A ROM 212 is a read only memory, which stores a boot program of the apparatus 210 and fixed parameters, for example.

An HDD 216 is a hard disk drive which is used to store various data. A reading control unit 214 controls an image reading process by a scanner. A printing control unit 215 controls an image printing process by a printer.

A sub CPU 221 executes a software program of the NIC 220, and controls the whole body of the NIC 220. A RAM 223 is a random access memory, which temporarily stores data when the sub CPU 221 controls the operation of the NIC 220. A ROM 222 is a read only memory, which stores a boot program of the NIC 220 and fixed parameters, for example.

A LAN control unit 224, which is connected to the LAN 110, controls data communication between the NIC 220 (the information processing apparatus 210, the communication system 100) and external devices on the LAN 110 (the LAN switch 120, the authentication server 130, or PCs connected to the LAN 110). The information processing apparatus 210 and the NIC 220 are connected by a Personal Computer Interconnect (PCI) bus.

The information processing apparatus 210 can operate by switching over between the normal power mode and the power saving mode that consumes less electric power than in the normal power mode. When the information processing apparatus 210 switches from the normal power mode to the power saving mode, power supply from a power supply control unit 230 to the main CPU 211, the HDD 216, and so on is stopped. On the other hand, the NIC 220 side is operating by using an Application Specific Integrated Circuit (ACIC) different from that of the information processing apparatus 210. Therefore, even after the information processing apparatus 210 has been switched to the power saving mode, the NIC 220 is being continuously supplied with power from the power supply control unit 230, and the NIC 220 maintains the connection (link) to perform communication via the LAN 100.

Figure 3:
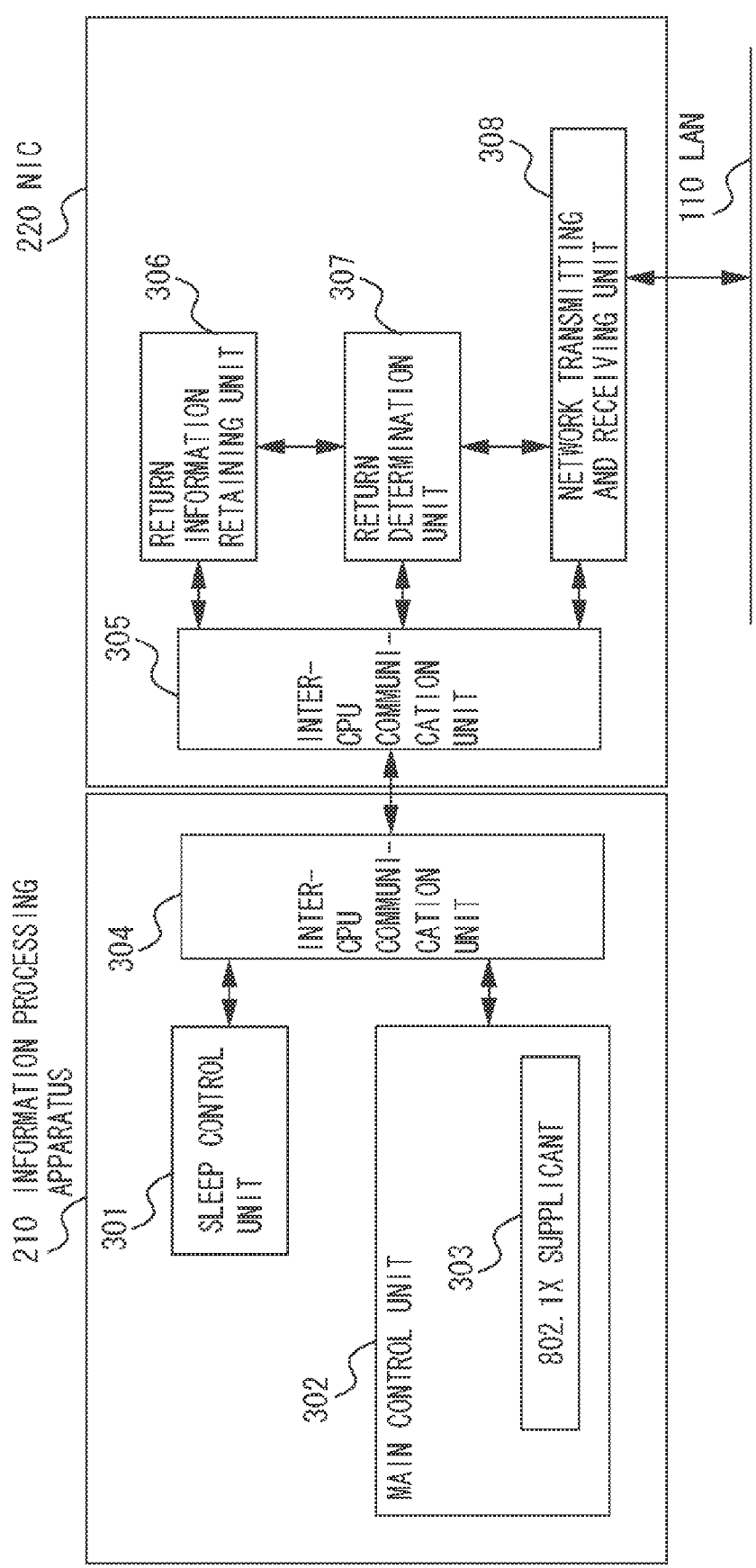
FIG. 3 is a software configuration of the communication system.

FIG. 3 is a block diagram illustrating a software configuration of the information processing apparatus 210 and the NIC 220. The function units in FIG. 3 become operational when the main CPU 211 and the sub CPU 221 each execute a control program.

A sleep control unit 301 controls a switchover between the normal power mode and the power saving mode by detecting that a condition for switching to the power saving mode has been met and also detecting that a condition for returning to the normal power mode has been met.

A main control unit 302 plays a role to control various operations of the information processing apparatus 210, and includes an IEEE 802.1X supplicant 303. In response to a request from the LAN switch 120, which includes an IEEE 802.1X authenticator, the IEEE 802.1X supplicant 303 executes an authentication process with the authentication server 130. As will be described below, also when the communication system 100 (the information processing apparatus 210) switches into the power saving mode, if the communication speed is changed, the IEEE 802.1X supplicant 303 performs an authentication process with the authentication server 130. The information processing apparatus 210 exchanges information with the NIC 220 via inter-CPU communication units 304 and 305.

When the communication system 100 switches to the power saving mode, a return information retaining unit 306 receives and retains return condition information sent from the information processing apparatus 210. A return determination unit 307 analyzes a packet which a network transmitting and receiving unit 308 receives from the 110 under the condition that the communication system 100 has switched to the power saving mode. The return determination unit 307 further determines whether the received packet matches the condition in the information retained by the return information retaining unit 306. Then, based on a result of the determination, the return determination unit 307 determines whether the received packet should be processed by the information processing apparatus 210 side or whether the communication system 100 should be returned to the normal power mode.

If it is determined that the received packet should be processed by the information processing apparatus 210 side, or if it is determined that the communication system 100 should be returned to the normal power mode, the return determination unit 307 instructs the power supply control unit 230 to cause the communication system 100 to return to the normal power mode. The return determination unit 307 transfers the received packet to the information processing apparatus 210.

If the communication system 100 has been operating in the normal power mode, the packet that the network transmitting and receiving unit 308 received from the LAN 110 is transferred to the information processing apparatus 210 without the packet being subjected to a determination by the return determination unit 307.

Figure 4:
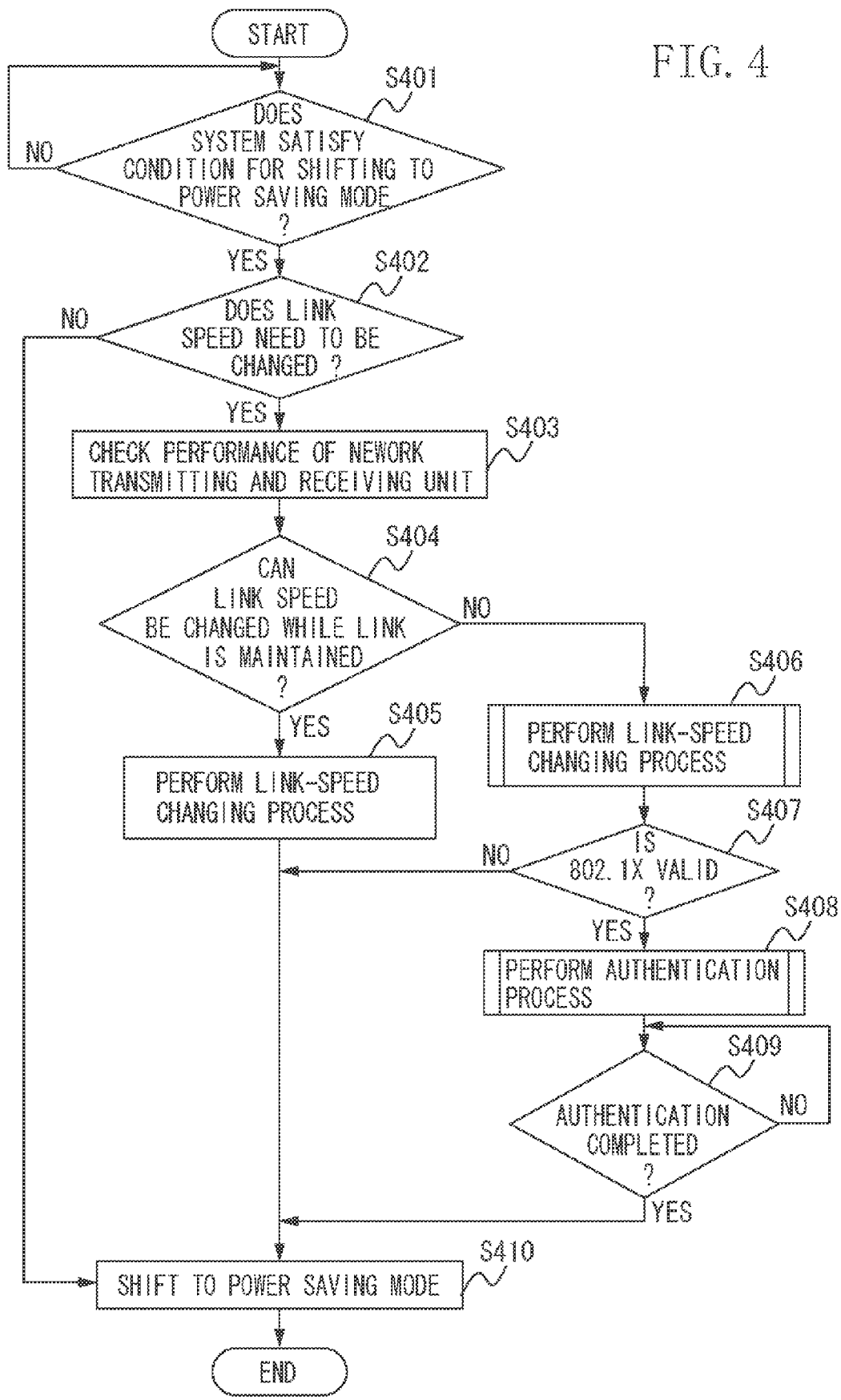
FIG. 4 is a flowchart illustrating the operation of the communication system.
Figure 5:
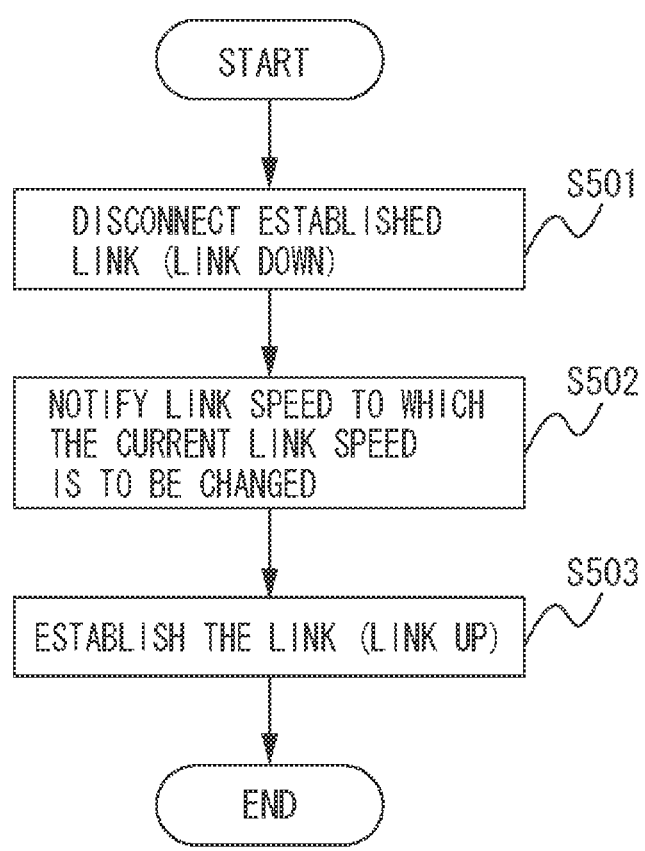
FIG. 5 is a flowchart illustrating the operation of the communication system.

FIGS. 4 and 5 are flowcharts illustrating a process to cause the communication system 100 to return to the power saving mode on condition that authentication based on IEEE 802.1X has been completed after the communication speed is changed when the communication system 100 is switched to the power saving mode. The steps in FIGS. 4 and 5 are carried out when the main CPU 211 of the information processing apparatus 210 executes the control program.

In step S401, the sleep control unit 301 determines whether it has been detected that the condition for the communication system 100 to switch to the power saving mode has been met.

When notification is received from the sleep control unit 301 about detection that the condition for switching to the power saving mode has been met (YES in step S401), the process advances to step S402. Otherwise (NO in step S401), notification is waited for.

To cite examples of a condition for switching to the power saving mode, one is a condition that the user has not operated the apparatus for more than a predetermined length of time and another is a condition the user issues an instruction to switch to the power saving mode. Yet another condition is an occurrence of an event that uses the power supply to switch to the power saving mode.

In step S402, it is determined whether the communication speed currently set in the network transmitting and receiving unit 308 is to be changed. In this case, if the communication speed has been set to 1000 Mbps, it is determined that the speed is to be reduced. The threshold value as a criterion for changing the communication speed may be some other value.

As a result of determination in step S402, if the main CPU 211 determines that the communication speed does not need to be changed (NO in step S402), the process proceeds to step S410, in which the CPU 211 notifies the sleep control unit 301 and the power supply control unit 230 that preparations for switching to the power saving mode have been completed, and instructs the two control units 301 and 230 to switch to the power saving mode.

On the other hand, if it is determined that the communication speed is to be changed (YES in step S402), the process advances to step S403, in which the CPU 211 checks the performance of the network transmitting and receiving unit 308. In step S404, it is determined whether the network transmitting and receiving unit 308 includes a function to change the communication speed while the link remains connected (whether the communication speed is changeable with the link being maintained). If the network transmitting and receiving unit 308 has a function to change the communication speed while the link remains connected (YES in step S404), the process advances to step S405, or if not (NO in step S404), the process advances to step S406.

In step S405, a process of changing the communication speed is executed with the link being maintained (without causing link down), and the process proceeds to step S410. In step S410, the sleep control unit 301 and the power supply control unit 230 are notified that preparations for switching to the power saving mode have been completed and instructed to switch to the power saving mode.

In step S406, the main CPU 211 executes a process of changing the communication speed. Details of step S406 are described with reference to FIG. 5.

In step S501, the main CPU 211 executes a process of disconnecting the link established between the NIC 220 and the LAN switch 120 (link down). In step S502, the main CPU 211 informs the network transmitting receiving unit 308 of a communication speed to be set anew. In step S503, a link is established between the NIC 220 and the LAN switch 120 (link up).

Referring back to FIG. 4, after the communication speed is changed in step S406, the process advances to step S407. In step S407, it is determined whether the IEEE 802.1X suppli-cant 303 has been effective. At this point, since an authentication process is to be performed according to IEEE 802.1X to connect to the LAN 110, let it be assumed that the IEEE 802.1X supplicant has been effective. However, in an environment where an authentication process according to IEEE 802.1X is not required, the IEEE 802.1X supplicant has been ineffective.

If it is determined that the IEEE 802.1X supplicant 303 has been ineffective (NO in step S407), the process proceeds to step S410. In step S410, the main CPU 211 notifies the sleep control unit 301 and the power supply control unit 230 that preparations for switching to the power saving mode have been completed, and instructs the two control units 301 and 230 to switch to the power saving mode.

On the other hand, if it is determined that the IEEE 802.1X supplicant 303 has been effective (YES in step S407), the process advances to step S408, in which an authentication process according to IEEE 802.1X is executed. Details of the process in step S408 are described referring to FIG. 6.

FIG. 6 is a sequence diagram illustrating details of an authentication process according to IEEE 802.1X. First, the communication system 100 (IEEE 802.1X supplicant) transmits "EAPOL Start" 601 to the LAN switch 120 (IEEE 802.1X authenticator). In response, the LAN switch 120 answers with a reply "EAP Identity" 601 to the communication system 100.

Subsequently, an authentication process (603) takes place between the communication system 100 and the authentication server 130 (IEEE 802.1X authentication server). Finally, the authentication server 130 transmits notification of a result of authentication "EAP Success/EAP Failure" 604 to the communication system 100. When the communication system 100 receives "EAP Success/EAP Failure" 604, the whole authentication process according to IEEE 802.1X is completed.

Referring back to FIG. 4, in step S409, it is determined whether the authentication process has been completed. When it is determined whether "EAP Success/EAP Failure" 604 has been received from the authentication server 130, if "EAP Success/EAP Failure" 604 has been received, it is determined that the authentication process is completed. If it is determined that the authentication process is completed (YES in step S409), the process advances to step S410, in which the main CPU 211 notifies the sleep control unit 301 and the power supply control unit 230 that preparations for switching to the power saving mode have been completed, and instructs those control units 301 and 230 to switch to the power saving mode.

On the other hand, if it is determined that the authentication process has not been completed (NO in step S409), the information processing apparatus 230 waits for the authentication process to end. In other words, the information processing apparatus 230 switches to the power saving mode on condition that the authentication process is completed.

In the above example, the authentication process based on IEEE 802.1X is regarded as completed when "EAP Success/EAP Failure" 604 is received. However, the authentication process based on IEEE 802.1X may be regarded as completed at the stage when the authentication process 603 is completed.

According to the configuration described above, it is possible to provide a mechanism that switches from the normal power mode to the power saving mode on condition that an authentication process is completed when the communication speed has been changed. In other words, sufficient power saving effects can be obtained even in environments where authentication is to be connected to the network.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-074364 filed Mar. 25, 2009, which is hereby incorporated by reference herein in its entirety.

What is claimed is:

1. An apparatus comprising:
    a detection unit configured to detect, when the apparatus is operating in a first power mode, whether a condition is met to switch the apparatus from the first power mode to a second power mode that consumes less power than the first power mode;
    a changing unit configured to change a communication speed for the apparatus to communicate via a network when the condition is met;
    an authentication unit configured to execute an authentication process when the communication speed has changed; and
    a control unit configured to prevent the apparatus from switching from the first power mode to the second power mode until the authentication process is completed, and switch the apparatus from the first power mode to the second power mode in response to the completion of the authentication process.

2. The apparatus according to claim 1, further comprising a determination unit configured to determine whether the authentication process is to be executed when the communication speed has changed,
    wherein, when the determination unit determines that the authentication process does not need to be executed, the control unit switches the apparatus from the first power mode to the second power mode.

3. The apparatus according to claim 2, wherein if the determination unit determines that the authentication unit is effective the authentication process is to be executed.

4. The apparatus according to claim 1, wherein after the communication speed has changed without disconnecting a link that the apparatus has established via the network, the control unit switches the apparatus from the first power mode to the second power mode without execution of the authentication process.

5. The apparatus according to claim 1, wherein the authentication unit executes the authentication process with an authentication server connected to the network.

6. The apparatus according to claim 5, wherein upon receiving notification of an authentication result from the authentication server, the control unit determines that the authentication process is completed.

7. A method comprising:
    detecting whether a condition is met to switch an apparatus from a first power mode to a second power mode that consumes less power than the first power mode;
    changing a communication speed for the apparatus to communicate via a network when it is detected that the condition is met;
    executing an authentication process when the communication speed has changed by an authentication unit; and
    preventing the apparatus from switching from the first power mode to the second power mode until the authentication process is completed, and switching the apparatus from the first power mode to the second power mode in response to the completion of the authentication process.

8. The method according to claim 7, further comprising determining whether the authentication process is to be executed when the communication speed has changed,
    wherein, when the determining determines that the authentication process does not need to be executed, the switching the apparatus from the first power mode to the second power mode.

9. The method according to claim 8, wherein the authentication process is executed if the determining determines that the authentication unit is effective.

10. The method according to claim 7, further comprising, after the communication speed has changed without disconnecting a link that the apparatus has established via the network, switching the apparatus from the first power mode to the second power mode without execution of the authentication process.

11. The method according to claim 7, wherein the authentication unit executes the authentication process with an authentication server connected to the network.

12. The method according to claim 11, further comprising determining the authentication process is completed upon receiving notification of an authentication result from the authentication server.

13. A non-transitory computer-readable storage medium storing a program for causing a computer to execute the method according to claim 7.

14. The non-transitory computer-readable storage medium according to claim 13, further comprising determining whether the authentication process is to be executed when the communication speed has changed,
    wherein, when the determining determines that the authentication process does not need to be executed, the switching the apparatus from the first power mode to the second power mode.

15. The non-transitory computer-readable storage medium according to claim 13, wherein the authentication process is executed if the determining determines that the authentication unit is effective.

16. The non-transitory computer-readable storage medium according to claim 13, further comprising, after the communication speed has changed without disconnecting a link that the apparatus has established via the network, switching the apparatus from the first power mode to the second power mode without execution of the authentication process.

17. The non-transitory computer-readable storage medium according to claim 13, wherein the authentication unit executes the authentication process with an authentication server connected to the network.

18. The non-transitory computer-readable storage medium according to claim 17, further comprising determining the authentication process is completed upon receiving notification of an authentication result from the authentication server.

19. The apparatus according to claim 1, wherein the authentication process is authentication process relating to IEEE802.1X.

20. The apparatus according to claim 1, wherein in the first power mode, the authentication process is executable by the apparatus, and in the second power mode, the authentication process is not executable by the apparatus.

21. The method according to claim 7, wherein the authentication process is authentication process relating to IEEE802.1X.

22. The method according to claim 7, wherein in the first power mode, the authentication process is executable by the apparatus, and in the second power mode, the authentication process is not executable by the apparatus.

23. The non-transitory computer-readable storage medium according to claim 13, wherein the authentication process is authentication process relating to IEEE802.1X.

24. The non-transitory computer-readable storage medium according to claim 13, wherein in the first power mode, the authentication process is executable by the apparatus, and in the second power mode, the authentication process is not executable by the apparatus.

* * * * *